April 22, 1952 M. DEN HERTOG 2,593,418

DISCRIMINATION OF SUBSCRIBER'S LINE CONDITION

Filed Feb. 4, 1947 7 Sheets-Sheet 1

INVENTOR
MARTINUS DEN HERTOG
BY
Robert Harding Jr.
ATTORNEY

INVENTOR
MARTINUS DEN HERTOG
BY
Robert Harding Jr.
ATTORNEY

INVENTOR
MARTINUS DEN HERTOG
BY
Robert Harding Jr.
ATTORNEY

April 22, 1952 M. DEN HERTOG 2,593,418

DISCRIMINATION OF SUBSCRIBER'S LINE CONDITION

Filed Feb. 4, 1947 7 Sheets-Sheet 4

INVENTOR
MARTINUS DEN HERTOG
BY Robert Harding Jr.
ATTORNEY

DISCRIMINATION OF SUBSCRIBER'S LINE CONDITION

Filed Feb. 4, 1947 7 Sheets-Sheet 5

INVENTOR
MARTINUS DEN HERTOG
BY Robert Harding Jr.
ATTORNEY

DISCRIMINATION OF SUBSCRIBER'S LINE CONDITION

Filed Feb. 4, 1947 7 Sheets-Sheet 6

INVENTOR
MARTINUS DEN HERTOG
BY Robert Harding Jr.
ATTORNEY

April 22, 1952 M. DEN HERTOG 2,593,418

DISCRIMINATION OF SUBSCRIBER'S LINE CONDITION

Filed Feb. 4, 1947 7 Sheets-Sheet 7

INVENTOR
MARTINUS DEN HERTOG
BY Robert Harding
ATTORNEY

Patented Apr. 22, 1952 2,593,418

UNITED STATES PATENT OFFICE 2,593,418

DISCRIMINATION OF SUBSCRIBER'S LINE CONDITION

Martinus den Hertog, Antwerp, Belgium, assignor to International Standard Electric Corporation, New York, N. Y., a corporation of Delaware Application February 4, 1947, Serial No. 726,359
In the Netherlands September 25, 1943

Section 1, Public Law 690, August 8, 1946
Patent expires September 25, 1963

17 Claims. (Cl. 179—18)

Figure 1A:
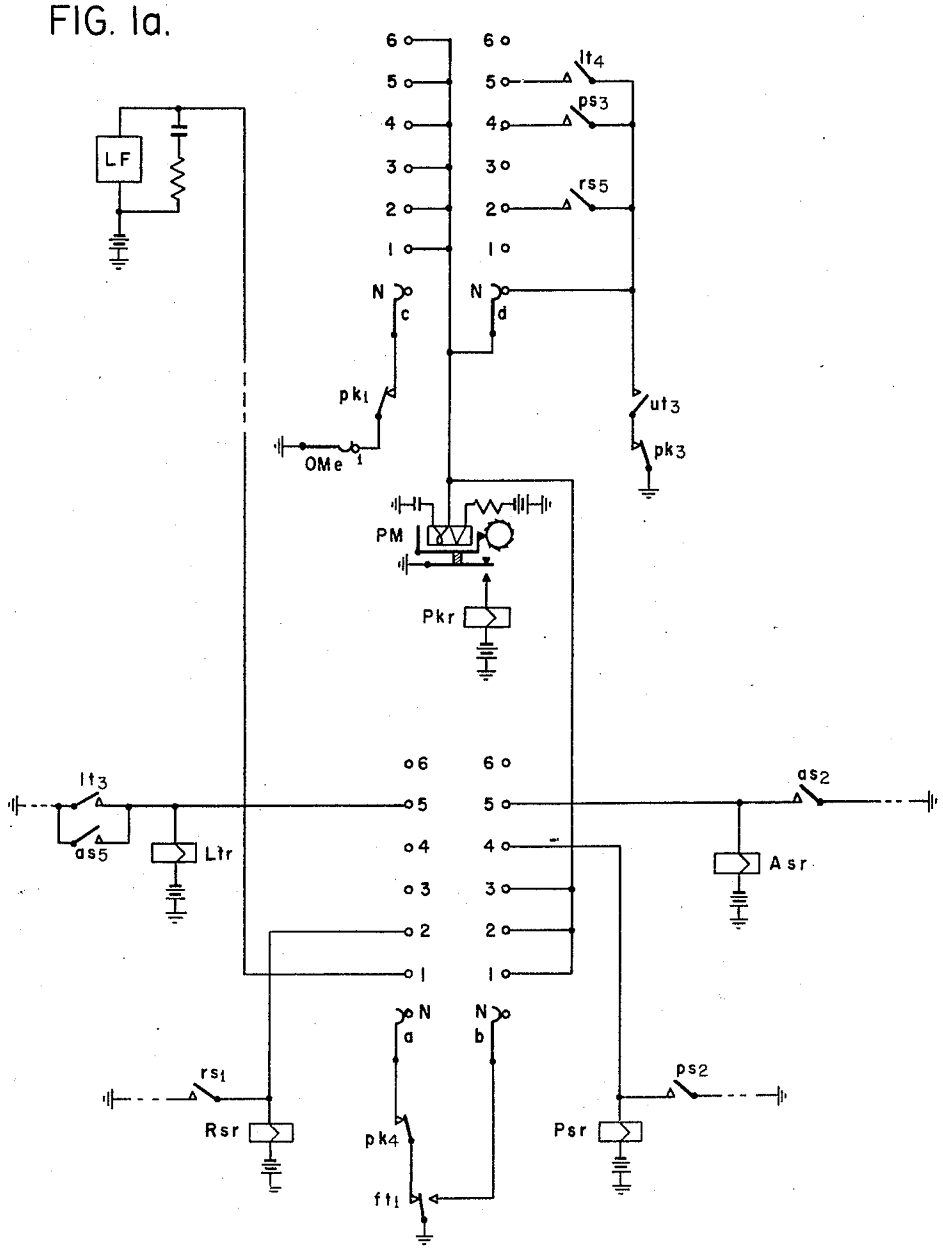

This invention relates to telephone systems and the like in which the different classes of subscribers' or other line circuits are distinguished, as are the different classes of calls which may be established.

It is generally known to characterize the free or busy condition of a line by the presence of different potentials on one of its conductors. For example, when a line is free, battery potential may be applied to its test conductor of such high value that a test relay of a hunting selector will operate over it, but if the line is busy, then this potential is reduced to zero, or to such a low value that test relays of hunting selectors cannot operate.

It is also known so as to arrange the test conductor that the potential may applied to it through two different resistances, thus distinguishing between two different kinds of lines. Different potentials are applied to the test conductor when the line is engaged by a selector for different types of lines, and this difference may be used to give a particular indication to a hunting selector. For example, the first line of a group of P. B. X lines may have a battery connected to its test conductor through a lower resistance than a main line, so that when a selector tests on the first line of a P. B. X group it may discriminate this as such, when it is in the busy condition, by the fact that the potential on the test conductor is higher than in the case of a main line. The discriminating signal thus received may be used to start the selector hunting over the group of P. B. X lines if the first one is busy.

The present invention relates to similar arrangements but employs a much wider range of potentials whereby many different kinds of lines and/or different kinds of calls may be distinguished. This may be attained by connecting either pole of a battery or other source of potential, either directly or through different resistances, to the test conductor of the line circuit, and indicating the busy condition of the line by connecting one pole of the battery through different resistances to the test conductor over the selector circuit, depending on the class of the call in which the line is engaged.

The invention further relates to means whereby, when the line is seized for a call, it is possible to ascertain which pole of the battery is connected to the test conductor, and to determine the class of the line end, if necessary, the class of call in which it is engaged. For this purpose, use is made of the device for detecting electrical potentials known from United States patent application Serial No. 765,022, filed July 31, 1947, and this device, besides being used to determine the potentials existing on a test conductor, is employed also to determine either the value of the resistance through which a potential corresponding to one of the poles of the battery is present on the test conductor, or the presence or absence of a rectifier in a test conductor, which rectifier may be utilized as a further means to indicate a particular condition of the line.

The invention further provides for means whereby different classes of calls may be signaled to the line by connecting a busy potential over different values of resistances thereto, and by using the corresponding electrical conditions on the line circuit to bring about a change in the class indication of the line under certain conditions.

Figure 1:
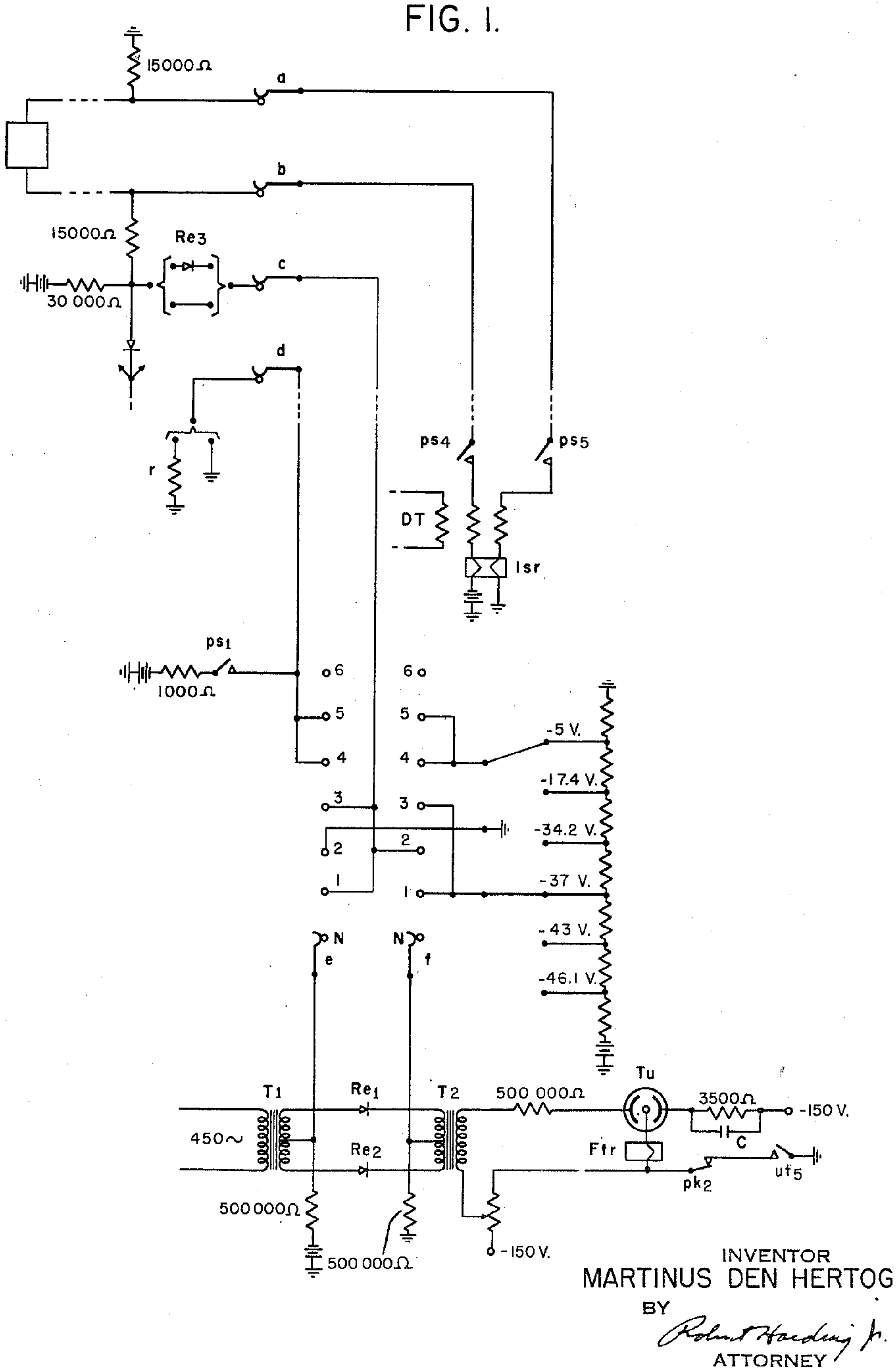
Figure 2:
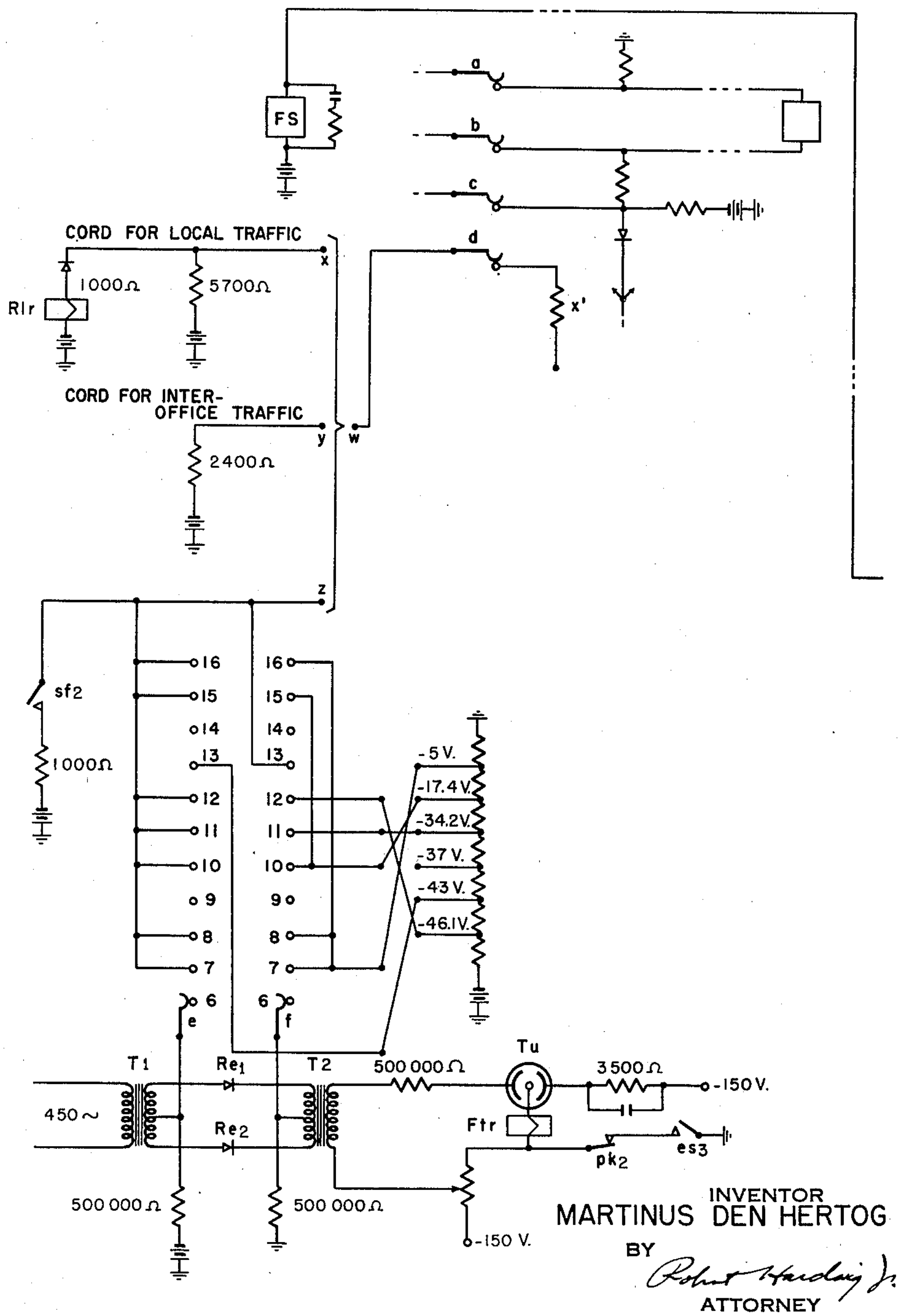
Figure 2A:
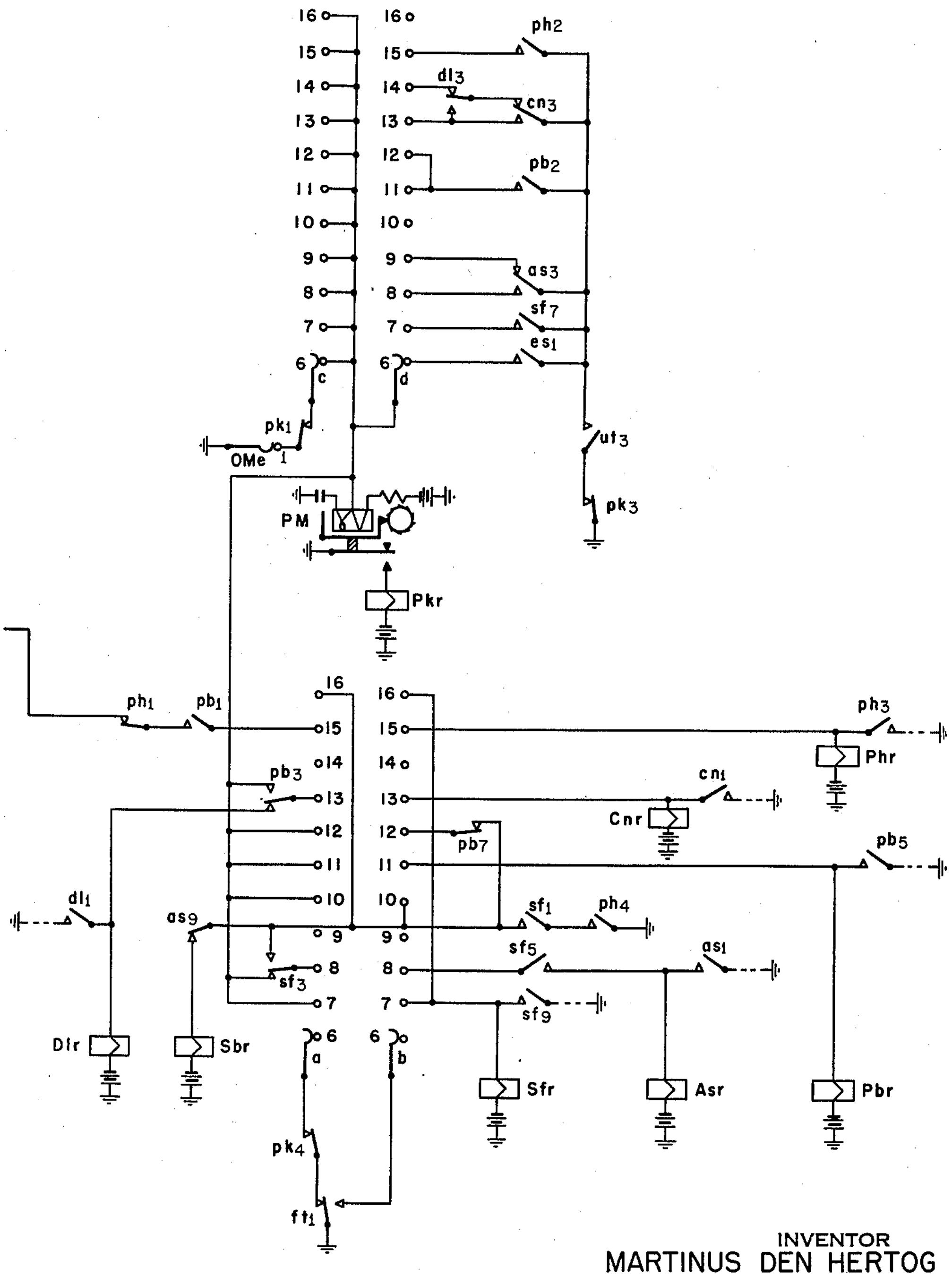
Figure 3:
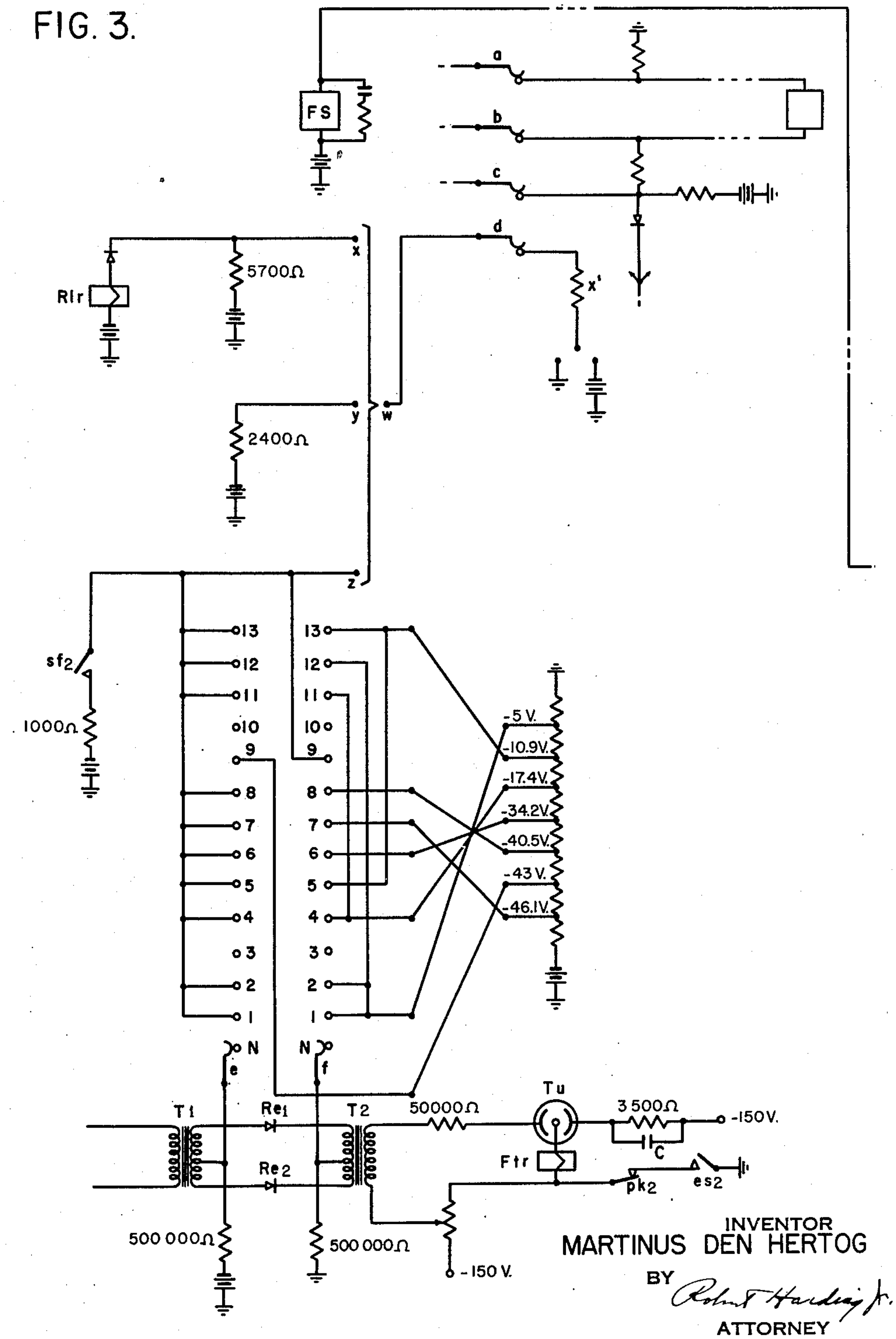
Figure 3A:
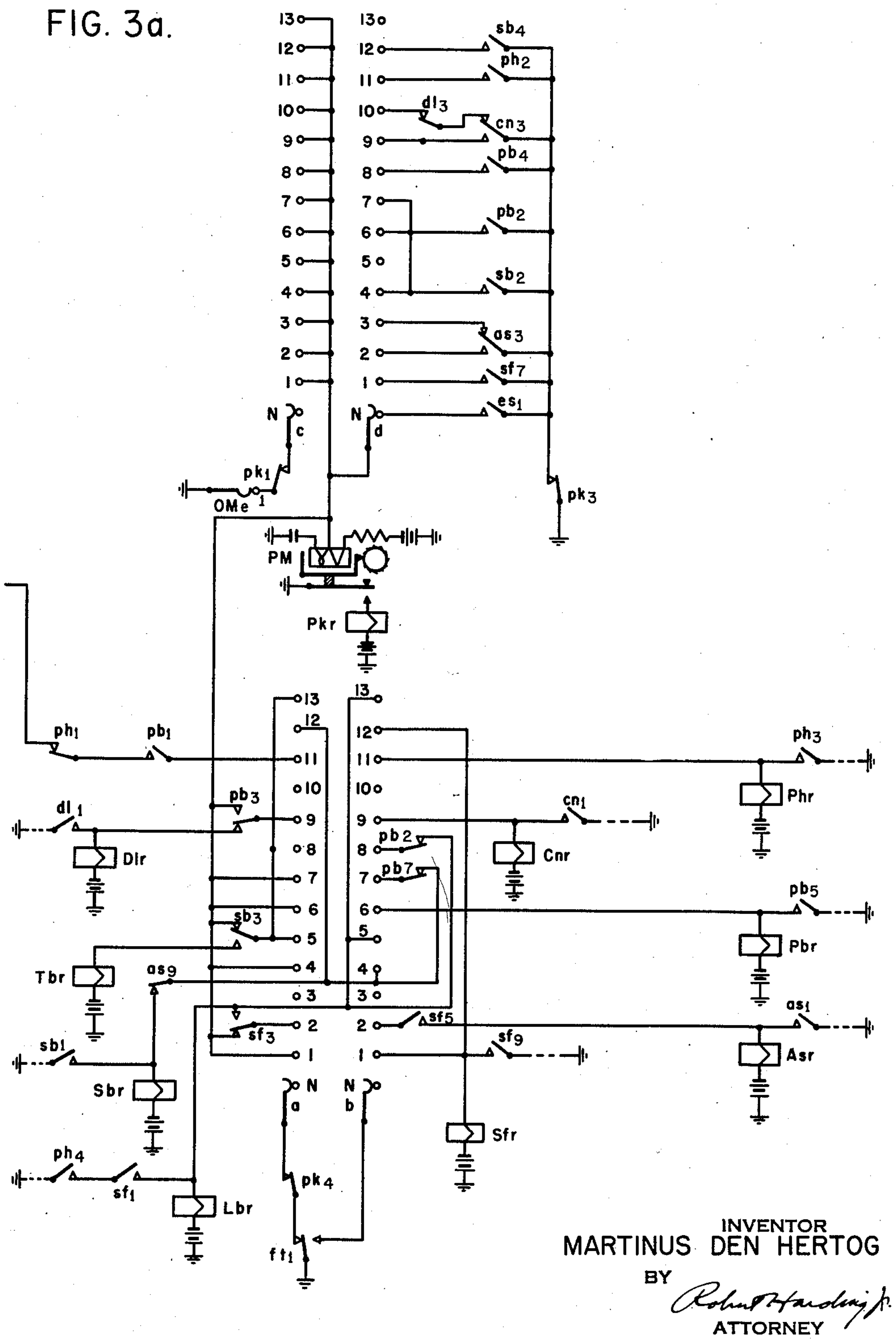
Figure 4:
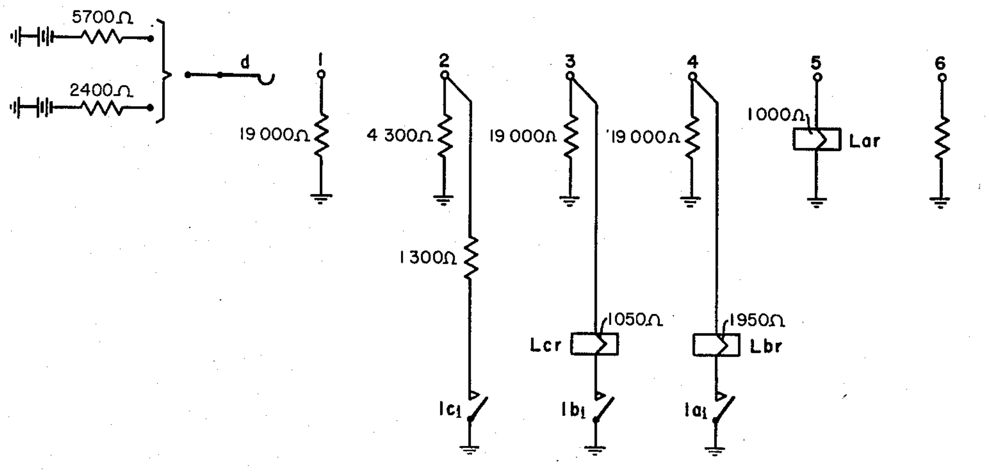

The invention will be described in greater detail by means of the drawings, in which, Figs. 1 and 1*a* represent a calling subscriber's line circuit which, through a line finder, is connected to a register circuit, part of which is shown in the remaining part of the figure;

Figs. 2 and 2*a* represent a called subscriber's line circuit, parts of local and toll connecting circuits and of a register circuit for establishing local calls;

Figs. 3 and 3*a* represent an arrangement similar to Figs. 2 and 2*a*, except that the register is arranged to establish toll calls; and Fig. 4 represents the connections to the test conductors of a number of subscriber lines arranged to restrict hunting to particular classes of lines in a group.

According to the invention, the following six classes of lines may be indicated by different electrical conditions, e. g. direct-current potentials (or absence of potentials) on one test conductor:

(*a*) Single line or intermediate line of P. B. X group.
(*b*) First line of P. B. X group.
(*c*) Last line of P. B. X group.
(*d*) Absent subscriber's line.
(*e*) Changed number line.
(*f*) Dead line.

Considering cases (*a*), (*b*) and (*c*) first, different arrangements are already known whereby P. B. X lines may be distinguished from individual lines, but all these known arrangements which employ means for discriminating potentials or resistances on one of the conductors of the subscriber's line, suffer from the disadvantage that only two indications can be given. For example, according to one known arrangement, potential is connected to the test conductor via one kind of resistance for all individual lines and for the last line of a P. B. X group, whereas the potential is connected through a different resistance for all remaining lines of the P. B. X group. When attempting to select a busy line of the latter kind, the presence of the particular type of resistance will cause further hunting for a free line. Since hunting is caused by all busy lines except the last, certain lines of the P. B. X group cannot be assigned for night service, during which they would have to be connected to particular substations at the P. B. X which can be called individually without hunting for other lines if busy.

A different arrangement is known from the British Patent 318,944, according to which a ground is supplied to a conductor per line only when this line is busy and to other than the last P. B. X lines, so that the presence of this ground indicates that the line is busy and forms part of a P. B. X group and that hunting should be initiated.

British Patent 296,044 discloses an arrangement whereby potential via one kind of resistance is connected to all individual lines, and to all except the first and last lines of a P. B. X group, these being connected to potential through a different resistance. This makes possible calls to intermediate P. B. X lines during the night, without hunting when the lines are busy, because these intermediate lines have the same characteristic condition as single lines. The final selector is, however, so arranged that if the first line of a P. B. X group is busy, then hunting is initiated and continues until either a free line is found or the last line is reached, which has the same electrical condition as the first line and, therefore, different from that of the intermediate lines. If a last line of a P. B. X group is selected directly by a calling subscriber and is busy, then hunting will start and the terminals of a wrong line will be selected.

According to the present invention, three different kinds of resistance are provided for the above identified three cases (*a*), (*b*) and (*c*), so that an intermediate line may be individually called in the same way as a single line, and the electrical condition on the last line of a group will be different from that on any other kind of line and no hunting will be initiated if the last line is selected individually. In the example shown in the drawings, the various conditions referred to above are indicated by connecting ground through 19,000Ω, 4,300Ω and 1,000Ω respectively, for the three classes of calls (*a*), (*b*) and (*c*), as is indicated in Fig. 4.

A further discrimination as shown in item (*d*) of the above list may be provided by connecting ground to the test conductor directly, without any resistance in series, and this discrimination is used, in the example shown in the drawing, to indicate an absent subscriber's line. When such line is called, its condition is recognized by the automatic equipment, which breaks down the connection towards the called line and automatically establishes another connection towards a special operator.

It will be appreciated that it is very convenient to use a direct ground to indicate an absent subscriber's line, because such a direct ground may be connected without disconnecting the resistance through which ground is normally provided at the test conductor when the line is not in the absent subscriber condition. When, therefore, a subscriber desires this service, all that is needed is to place a direct ground on the test conductor of his line. When the line is permanently arranged for this facility, because the service is often required, a relay may be added to the line and energized or released by an operator to connect full ground in parallel to the existing resistance on the test conductor. Alternatively, if the line has to be converted into the absent subscriber condition for a long period, the direct ground to the test conductor may be provided by various means, for example, by the replacement of the resistance by a direct ground connection, or the short-circuiting of this resistance.

Considering now the case of a subscriber's line, which has been changed into the absent subscriber condition on the calling side, the usual arangement is that when the first call is originated upon the return of the subscriber, it is directed by means of a special finder and junction equipment to the operator handling absent subscribers' service, so that the subscriber can inform the operator that his line should be restored to normal.

According to the present invention, the absent subscriber condition is recognized also on the calling side by the register when it is connected to the calling line. The register will cause the automatic establishment of a connection to the absent subscriber desk, via the regular automatic selector and junction equipment and without any intervention on the part of the subscriber. In this way the need for special line finder and junction equipment to route calls from lines in the absent subscriber condition to the absent subscriber desk is avoided, so that the only connection needed on a regular subscriber's line, to bring it into the absent subscriber condition, is the direct ground on the test conductor.

A further possibility for distinguishing a line is by not connecting its test conductor to ground, but to battery, as represented by item (*e*) of the list. This condition may be distinguished from any of the conditions (*a*) to (*d*) by the fact that when a busying potential is applied to the test conductor from the automatic equipment which engages the line, the potential on this test conductor can never reach the full value of the exchange battery, if it is connected at the line circuit to a ground, either directly or through a resistance, because the busying potential is applied through a certain amount of resistance. Only by connecting the test conductor of the line circuit to battery potential through a resistance, as happens in case (*e*), may the automatic equipment find the potential of this conductor to be equal to the full battery potential. This is used to indicate a changed number, i. e. the fact that the use of a certain subscriber's number is discontinued for a particular subscriber, so that calls directed thereto have to be routed to an operator or have to receive a particular indication, for example, a non-obtainable number tone. The application of full battery potential to the test conductor of such a line will cause the automatic equipment to extend the connection as required. In this case also, the connection to the called number will be automatically broken down.

Although the example shown in the drawings provides only one class of line whose test conductor is connected through a resistance to the negative pole of the battery, more than one class of such lines may be distinguished by connecting the test conductor to the battery through different values of resistances in a manner similar to that shown for lines having their test conductors connected to ground through different values of resistance.

A further condition, as listed under item (f), is provided by leaving the test conductor open at the line equipment, so that neither battery nor ground potential is connected thereto. This may be used, as shown in the example embodied in the drawing, to indicate that the subscriber's number has not been taken into use, so that calls thereto should be broken down and the caller given a special tone or connected to an operator's desk.

According to the invention, not only a particular kind of subscriber's line may be indicated, by means of the potential on the test conductor of the line, but also the class of call on which a subscriber's line is engaged. It is sometimes required to make a distinction between different classes of calls, for example, local calls and toll calls, preference being given to a toll call in case a wanted subscriber's line is locally engaged. For this reason, it is necessary to provide an electrical distinction between the local and the toll busy conditions. In certain cases this is done by means of a tone which, for toll connections, is connected to the test conductor of the line, and may be heard by an operator who wants to establish a toll connection thereto. In other cases, the difference between the local and toll busy condition is obtained by arranging the toll switching circuits in such a manner that, after they have tried to break down an existing connection, a check is made to verify whether the attempt has been successful. As breakdown is possible only in the case of a local connection and not in the case of a toll connection which kept the line engaged, the failure to break down the existing connection indicates that the line is toll busy, but this is not known until the operator has actually tried to break down the connection, and no indication to this effect can be received immediately after the connection towards the line has been set up.

According to the present invention, there is a permanent electrical difference on the test conductor between lines engaged on local and on toll connections, so that when a toll connection is directed to a line which is already engaged by a previous toll connection, this fact may be immediately signaled to the operator, and the circuit may be so arranged that any attempt to break down the existing connection is prevented. At the same time, the arrangement is such that local and toll connections may be established via a common train of selectors at least in the final selecting stage.

To indicate the difference between local and toll connections, in electrical conditions of the test conductor, the busying potential for local calls is provided via a resistance different from that for toll calls, so that the value of the potentials on the test conductor will differ for toll and local connections. In the example disclosed, the busying potential supplied from a local connecting circuit is applied through a resistance of 5,700 Ω, whereas that from a toll connecting circuit through 2,400 Ω. Assuming a 48-volt exchange battery, each class of line may have two different potentials on its test conductor, depending whether it is engaged for a local or a toll connection; for example, when a last P. B. X line is engaged, the potential on its text conductor will be 7.2 volts in case of a local connection, and 14.1 volts in case of a toll connection.

It will be evident that it is not necessary to know the difference between a local and a toll busy connection in case of local calls. This is required only when an attempt is made to establish a toll call to a busy line. For this reason, only the toll switching circuits, which test for the potential existing on the test conductor are arranged to discriminate between the potentials representing local and toll busy conditions. The local registers discriminate only between the different potentials of different classes of lines. For this reason, the arrangement of resistances is such that the six different potentials for the three classes of lines to which calls may have to be switched through (items (a), (b) and (c) of the list) appear in pairs, one pair for one class. The testing for these potentials is arranged to discriminate only between the pairs, and thus between the different classes. The discrimination is effected by a method of elimination.

For example, assuming an individual line to be busy, the discriminating arrangement starts to check for the presence of the potentials of 7.2 volts and 14.1 volts, being so arranged that it will operate on any potential lower than, say, 15 volts. In the case assumed it does not operate, which indicates that the called line is not a busy last P. B. X line. It will next be set to operate on any potential lower than, say 32 volts, so that if the line were a first P. B. X line and its potential were, therefore, between 15 and 32 volts, it would operate. In the case assumed, however, it will not operate, thereby eliminating the possibility that the called line is a first P. B. X line. Then the discriminating arrangement is set to energize on potentials lower than, say 43 volts, and it will accordingly now function whether the line is local busy (potential 36.9 volts) or toll busy (potential 42.7 volts). Only in case of a toll call, after it has been definitely established that the line is either an individual line and busy, or after the final selector has arrived on a last P. B. X line which is busy, will the automatic toll switching equipment proceed to make a discrimination between a local and a toll busy condition, as described below in the detailed circuit operation.

An alternative method to establish the class of a busy line is to connect the discriminating arrangement so that it will eliminate the various possibilities, commencing with the highest pair of potentials.

As mentioned above, the arrangement is such that local and toll connections may be completed via a common train of selectors. This in itself is already known, but the use of combined local and toll selectors has a very serious reaction on the possibilities of P. B. X hunting. It is obvious that, if a whole group of lines is occupied, there will be a tendency to direct a new toll or local call to such a group to the last line, but a local connection in which the last line may be engaged will be broken down only in favor of the toll connection. If another toll call should arrive for this group, then it would normally also be directed to the last line, and on finding it already toll engaged, would prevent the operator from completing the toll connection, in spite of the fact that there may still be several lines of the same P. B. X group busy on local calls which might be broken down.

In order to obviate this tendency for toll calls to go to the last line of the group, arrangements are already known from British Patent 211,013, whereby group hunting is restricted to free or local busy lines, in case the last is toll busy. This is accomplished by providing a relay which operates for toll calls only and which, when a last line becomes engaged in a toll connection, provides the "last line" conditions on the next-to-the-last line. If this line also is or becomes engaged in a toll connection, then a relay will operate to provide the "last line" condition on the preceding line, and so on. This method was made possible only by the fact that separate final selectors were employed for local and toll connections, so that the relay indicating the toll busy condition could be inserted in series with the multiple between the local and toll finals. Such arrangements could not be used with combined local and toll finals because no electrical indication can be given that the line became engaged in a toll connection. In accordance with the present invention, the electrical indication is provided by applying the busying potential for toll connections over a resistance different from that for local connections, and this leads to the possibility of restricting P. B. X hunting to free or local busy lines, even when combined local and toll finals are used.

The circuits provide also for an arrangement whereby the presence of a rectifier in one of the subscriber's line conductors may be checked, to indicate a particular characteristic of a line which may be the common property of some of any of the classes of lines so far discussed, except dead lines. The rectifier may be inserted in series with the connection to ground or battery, which either directly or through a resistance is provided to the test conductor of a line, or alternatively, it may be inserted in series with one of the other conductors of the subscriber's exchange equipment to which the discriminating equipment at the register, used for checking the electrical condition or the test conductor, may be given access. In the example embodied in the drawing, a rectifier is inserted in the *c* wire of the subscriber's line (see Fig. 1) for a line permitted restricted service facilities only. When a call is originated on such a line, the register checks for the presence of this rectifier, and when finding it connected, will see to it that certain classes of calls are not completed or are routed in a predetermined manner.

A detailed description of the operation will now be given.

Referring to Figs. 1 and 1*a*, when a call is originated on the line shown in the top left hand corner of Fig. 1, the potential at the point of juncture of the 15,000 Ω and 30,000 Ω resistances connected to the subscriber's *b* wire will be reduced, which causes the origination of a call, in a known manner. This reduced potential will be present also in the *c* multiple of the subscriber's line, which is connected over all first line finders, one of which has been indicated on the drawing.

*Position 1.—Control of hunting of first line finders*

When a register has been seized by a call, and has been brought into the condition in which it may control the hunting of a first line finder for the calling line, a relay Utr (not shown) is operated to close its contact $ut_3$, a circuit for switch PM (Fig. 1*a*), forming part of the register which then advances from the normal position to position 1, as follows: ground via break contact $pk_3$ make contact $ut_3$, normal terminal and brush *d*, power magnet and series resistance of PM to battery. The power magnet operates and causes the energization of relay P*kr* on its interrupter contact. This relay at its contact $pk_3$ removes the ground from the power magnet PM which releases and moves the brushes to position 1, whereupon P*kr* releases.

In position 1 of PM, the circuit is closed for the operation of the first line finder, as follows: ground, break contacts $ft_1$ and $pk_4$, brush *a* and terminal 1 of PM, the power magnet LF of the line finder to battery. The line finder hunts until it finds the calling line when the potential existing on the *c* conductor will be transmitted via the *c* brush of the line finder to the register circuit, where it is connected to the mid-point of the secondary winding of the transformer $T_1$, via brush *e* of PM in position 1. The transformer $T_1$ forms part of a static switch, such as has been described in U. S. application Serial No. 765,022 filed July 31, 1947, and the potential existing on the subscriber's *c* conductor causes a flow of direct curent through the static switch via the mid-point of the primary winding of transformer $T_2$, brush *f* of PM, which in position 1 is connected to a potential of −37 volts taken from a potentiometer. It should be noted that so long as the calling line has not yet been reached, the potential at the mid-point of transformer $T_1$ is kept at full battery potential of −48 volts through a resistance of 500,000 Ω which is connected thereto, so that the rectifiers $Re_1$ and $Re_2$ are kept in a non-conducting state. By the arrival of the finder on the calling line, these rectifiers become conducting, whereby a 450-cycle alternating current will be transmitted through both transformers to the control electrode of cold cathode tube T*u*, which lights and causes the energization of a relay F*tr*. The circuit for this relay is completed from −150 volt battery, through a 3,500 Ω resistance, shunted by condenser C, which causes the flow of a transient peak current of high value at the moment the valve operates, through the main gap of the tube T*u*, winding F*tr*, break contact $pk_2$ and make contact $uf_3$ to ground. It is assumed that the contact $uf_5$ is already closed. F*tr* operates and at its break contact $ft_1$ (Fig. 1*a*) opens the circuit for the power magnet LF, stopping the line finder on the calling line. At its make contact, $ft_1$ closes a circuit from ground via brush *b* for the power magnet of switch PM, which operates and energizes P*kr*. $pk_2$ now removes the ground from the winding of F*tr* and the anode of the tube T*u*, so that F*tr* releases and the tube extinguishes; but as $pk_4$ opens the lead from the break contact $ft_1$, the release of F*tr* does not cause the re-energization of the line finder power magnet. The circuit for PM is opened at the make contact $ft_1$ and this switch now releases and takes a step, after which relay P*kr* deenergizes.

*Position 2.—Check for restricted line*

In position 2 a check is made to see whether a rectifier is inserted in the subscriber's *c* conductor, which would indicate that the line is restricted. This is done by reversing the connections to the static switch in such a manner that the *c* brush of the line finder is now connected to the midpoint of transformer $T_2$; and the midpoint of transformer $T_1$ to a direct ground potential via brush *e* and terminal 2 of PM. In this manner, the rectifiers $Re_1$ and $Re_2$ will become conductive only when a current flows from the subscriber's *b* wire to ground. This is not possible if a rectifier $Re_3$ is connected in the *c* conductor because this would permit a current to pass only when the potential at the register is negative with respect to that on the subscriber's *b* wire. With ground connected at the register, a rectifier $Re_3$ in the *c* conductor will prevent the flow of current, so that the static switch will not function, and Ftr will remain on its break contact.

In the case of non-restricted lines, however, in whose *c* wire no rectifier $Re_3$ is connected, the static switch will function and Ftr will operate.

Assuming the case of a restricted line, relay Rsr operates in position 2 of PM, in the following circuit: ground via break contacts $ft_1$ and $pk_4$, brush *a*, PM position 2, winding of Rsr to battery. Relay Rsr operates and locks on its contact $rs_1$, and in its contact $rs_5$ it provides a circuit for the advancing of switch PM, via brush *d* from position 2 to position 3.

If the line is non-restricted, Rsr will not operate, because before it can energize. Ftr operates and closes a direct circuit for advancing PM from position 2, over brush *b* in the same manner as described in position 1.

Rsr, when operated, records the fact that the line is restricted so that if a non-permissible call is dialed, the register will re-route it to an operator.

*Position 3.—Check for calling condition*

In position 3, the fact that the line is in the calling condition is checked once more, in order to ascertain whether the line finder has stopped with the test brush properly closed on the terminals of the calling line. The conditions in positions 3 are the same as in position 1, except for the fact that the circuit for the power magnet of the line finder cannot be closed. As a consequence, when the line finder has been properly stopped, Ftr will operate and drive PM from position 3 to position 4.

*Position 4.—Check for free or busy condition of line*

In position 4, a check is made to ascertain whether the line has been engaged by a final selector during the interval which elapsed between the lifting of the receiver at the calling station and the seizure of the line by a line finder.

If that were the case, then a battery potential would be connected via the final selector *d* brush to the *d* conductor of the calling line which, if a normal line, is connected through a resistance *r* to ground, therefore, a potential of a minimum of 7.2 volts, depending on the class of call and/or line would be found to exist on the *d* conductor. When, therefore, the line is free, the potential on the *d* conductor will be 0. This fact is ascertained by connecting the *d* conductor in position 4 to the midpoint of transformer $T_1$ of the static switch, whereas the midpoint of transformer $T_2$ is connected to −5 volts. Current will flow through the static switch only when ground potential exists on the *d* conductor, that is, when the line is free. Assuming this to be the case, Ftr will operate and close a circuit via the *b* brush in position 4, for relay Psr, which energizes and locks on its contact $ps_2$, and in its contact $ps_3$ closes a circuit for the advance of PM from position 4 to position 5.

When Ftr does not operate, i. e. if the line is busy, PM will stop in position 4 until the register is released, which happens automatically when the calling condition disappears.

*Position 5.—Check for absent subscriber condition*

In position 5 a check is made for the presence of a full ground on the subscriber's *d* conductor which, as explained above, indicates absent subscriber service condition. The connection of the static switch in position 5 is the same as in position 4 so that it would function in the same manner as in position 4. However, it will not function when the ground to the *d* wire is connected through a resistance *r* for the following reasons:

At the moment Psr operates, it closes at its contact $ps_1$ a circuit from battery through a 1,000 Ω resistance to terminals 4 and 5 in the *e* arc of PM. This battery has no effect in position 4, because Psr operates only after the tube Tu and relay Ftr have functioned, but in position 5 the battery will prevent the static switch from operating when the ground on the subscriber's *d* conductor is connected through a resistance *r*, because in that case the potential on the *d* conductor will be raised to such a value that it becomes negative with respect to the −5 volts connected to the mid-point of the transformer $T_2$ over *f* of PM. Consequently, only with a full ground on the *d* wire will the potential at the mid-point of $T_1$ be positive with regard to the −5 volts referred to, and cause the functioning of the static switch. Assuming this to be the case, a circuit will be closed in position 5 of PM, via make contact $ft_1$ and arc *b* for operating Asr, which locks on its contact $as_2$, whereas in its contact $as_5$ it causes the operation of Ltr.

If the line is not in the absent subscriber condition Ftr will remain on its break contact and only Ltr will be operated via break contacts of $ft_1$ and $pk_4$ and arc *a*.

The operation of relay Ltr indicates that the check on the calling subscriber's line has been completed, and the register is adjusted to receive impulses and select the wanted subscriber's number. In case relay Asr is operated the register will control the selection of an operator without waiting for impulses from the calling subscriber. When, therefore, the absent subscriber returns home and lifts his receiver, he will be automatically connected to the special service operator. Ltr at its contact $lt_4$ closes a circuit for the advancing of PM from position 5 to position 6, in the manner described for position N.

*Operation on called subscriber's line*

Figs. 2 and 2*a* show a subscriber's line circuit and part of a local register circuit in which resistance *x'* which is connected in the subscriber's *d* conductor may have different values, and it may be connected to ground or to battery, or it may be left open, depending on the kind of service to which the line is entitled or the kind of connection in which it is engaged.

If a subscriber is engaged in a local connection, a battery will be connected through a resistance of 5,700 Ω via the *d* brush of the final selector. For this purpose, it should be assumed that point *x* is connected to point *w*. Relay Rlr is connected in parallel to the 5,700 Ω resistance in the local cord over a rectifier which will pass current only when the potential at the *d* brush of the final selector is of a higher negative value than the normal exchange battery potential. No current, therefore, will pass through relay Rlr when a local cord is connected to the line.

The relay Rlr may be operated by a toll operator who tries to break down a local connection by connecting for a short time high negative potential, for example −60 volts, to the subscriber's

*d* conductor. The operation of R*lr* then causes the release of the local connection.

When a subscriber's line is engaged in a toll connection, battery via a resistance of 2,400 Ω will be connected from the toll switching circuits via the *d* brush of the final selector to the subscriber's *d* conductor.

The various possible cases will now be described in systematic order:

*Local call to free line*

The switch PM which is shown in Figs. 2 and 2*a* is the same as that indicated in Figs. 1 and 1*a*, but for the sake of clarity, the first five positions have been eliminated, so that the drawing starts from position 6. It is assumed that when a subscriber's line has been selected, the switch stands in position 6, so that when selection is complete, the operation of a relay E*sr* (not shown) will cause it to leave position 6 and go to position 7, in the following manner: Ground via break contact $pk_3$, make contact $ut_3$ and $es_1$, terminal 6 and brush *d* of PM, power magnet and series resistance of this switch to battery. PM operates and energizes P*kr* and opens the operating circuit for PM which releases and moves its brushes to position 7, releasing P*kr*.

*Position 7.—Check for free called line*

In position 7, the *d* wire of the called subscriber's line is connected to the mid-point of transformer $T_1$, via brush *e* and the mid-point of the transformer $T_2$ is connected to −5 volts via *f*, so that the static switch will function only if the potential on the subscriber's *d* wire is substantially less than −5 volts, which is the case only when it is either free or when a full ground is connected to it. Assuming the line to be free, F*tr* will operate and this will cause the operation of relay S*fr* via the *b* arc in position 7. S*fr* locks on its contact $sf_9$ and causes the advance of the switch PM by closing over the *d* arc a circuit in $sf_7$.

*Position 8.—Check for called line in absent subscriber service condition.*

In position 8, a battery over 1,000 Ω is connected to the mid-point of transformer $T_1$ via the *e* brush and make contact of $sf_2$. Otherwise, the conditions for the static switch are left unchanged, so that, as already explained above in the case of checking for absent subscriber condition on the calling line, the static switch can operate only when a full ground is present at the subscriber's *d* conductor. The fact that battery is connected via 1,000 Ω would normally produce a potential which is negative with respect to the −5 volts connected to the mid-point of $T_2$, if the ground on the subscriber's *d* conductor is connected through one of the three types of resistances provided for normal lines. If, as assumed, the call originates on a normal line, the static switch will not function, and, therefore, relay F*tr* remains in its unoperated condition, in which it closes a circuit for the operation of relay S*br* as follows: ground, break contacts $ft_1$ and $pk_4$, *a* brush in position 8, make contact $sf_3$, break contact $as_9$, winding S*br* to battery.

In the condition now described, relays S*fr* and S*br* are operated together. Relay S*br* is the one which causes the switching through of the cord cord circuit and the disconnection of the register therefrom. The operation of relay S*fr* at this time adjusts the cord circuit to ring the called subscriber and to send a ringing tone to the calling subscriber. The switch PM remains in position 8 until the register releases, whereupon it is restored via its *c* arc because ground is connected thereto over brush *e* of switch PM which is now in position 1.

*Local call to line in absent subscriber service condition*

Referring to the operation for a call to a free line, when switch PM arrives in position 8, a check is made whether the line is in the absent subscriber service condition. If this is the case, then the static switch and relay F*tr* function and the circuit of relay S*br* is not closed as described for a free line, but a circuit is closed for the operation of relay A*sr* as follows: ground, make contact $ft_1$, *b* brush in position 8, make contact $sf_5$, winding of A*sr* to battery. A*sr* operates and locks on its contacts $as_1$, and on its contact $as_3$ closes a circuit to advance PM from position 8 to position 9, via the *d* brush.

The further functions of A*sr* will not be described, as they have no relation to the present invention. It may be mentioned, however, that the switch PM will stop in position 9 while the register, under the control of A*sr*, establishes a connection to an operator and PM returns to normal when the register releases.

*Local call to a busy last P. B. X line*

When selection is complete, E*sr* operates and advances PM to position 7, as described for a call to a free line. In position 7, a check for a free subscriber takes place, but as the potential on the subscriber's *d* wire is higher than the −5 volts connected to the mid-point of $T_2$ in position 7, the static switch does not function, so that F*tr* remains on its break contact. A circuit will, therefore, be closed for the advancing of PM from position 7, as follows: ground, break contacts $ft_1$ and $pk_4$, brush *a* in position 7, power magnet and series resistance of PM to battery. The switch advances to position 8 without having caused the operation of relay S*fr*.

*Position 8.—Repeated check*

Owing to the fact that relay S*fr* was not operated, the conditions in position 8 are the same as in position 7, so that F*tr* does not operate and closes a circuit via the *a* arc of PM and break contact $sf_3$, for the advancing of PM from position 8 to position 9.

*Position 9.—Passing*

Position 9 is passed by providing a circuit for PM via its *d* arc and break contact $as_3$.

*Position 10.—Check for last P. B. X line busy*

The potential on a busy last P. B. X line may be either 7.2 volts or 14.1 volts, and in position 10 a check is made with 17.4 volts connected to the mid-point of transformer $T_2$, so that the static switch may function if either of the two first-mentioned potentials is present on the subscriber's *d* wire, as is now assumed. The operation of F*tr* in position 10 closes a circuit for S*br* as follows: ground, make contact $ft_1$, *b* brush and terminal 10 of *b* arc, break contact $as_9$, winding S*br* to battery.

As already described, the operation of S*br* causes the advance of the cord circuit and the freeing of the register, but as this relay now operates without the simultaneous operation of S*fr*, the cord is now switched into the condition in which it supplies busy tone to the calling subscriber and releases the connection set up to the called line. Switch PM stops in position 10 until the release of the register causes it to return to normal via its *c* arc.

*Local call to busy single line*

The potential prevailing on the subscriber's *d* conductor in case of a single busy line may be either 36.9 or 42.7 volts.

Referring to the description of the operation under the heading "Local Call to a Busy Last P. B. X Line," the operation for the case to be considered now is the same up to position 10, in which a check is made by the static switch, with a potential of 17.4 volts connected to the mid-point of transformer $T_2$. Under those conditions, the static switch does not function on a busy single line, and accordingly a circuit will be closed for the advance of switch PM over the *a* arc in position 10, in the same manner as already described for previous positions.

*Position 11.—Check for first P. B. X line busy*

In position 11, the potential connected to the mid-point of transformer $T_2$ is −34.2 volts, and as this is also below the potentials prevailing on a busy single line, the static switch will again not function and PM will be advanced via the *a* arc, from position 11 to position 12.

*Position 12.—Check for single line busy*

In position 12, the potential connected to the mid-point of transformer $T_2$ is −46.1 volts, and under these conditions the static switch will function on a busy single line. Accordingly, F*tr* operates in 12 and closes a circuit for the operation of S*br* as follows: ground, make $ft_1$, brush *b* and terminal 12, break $pb_7$, break contact $as_9$, winding S*br* to battery. S*br* fulfills the same functions as described for the case of the busy last P. B. X line, so that busy tone is given to the caller and the register is freed.

*Local call to dead line or changed number*

In case of a changed number, the subscriber's *d* conductor is connected through a resistance of 10,000 Ω to full −48 volt exchange battery. In the case of a dead line, the *d* conductor is open. In either case, the operation will be the same as described for a local call to a busy single line, up to position 12.

*Position 12.—Passing*

When a check is made in position 12, with −46.1 volts connected to the mid-point of transformer $T_2$, the static switch is unable to function because, in the case of a changed number, the potential on the *d* conductor is negative with respect to that at the mid-point of $T_2$, whereas in the case of a dead line the *d* wire is open and, therefore, no current can flow to the *d* conductor, but a battery through 500,000 Ω resistance connected to the mid-point of $T_1$ takes care also in this case that the potential at this point is negative with respect to that at the mid-point of $T_2$. Accordingly, a circuit will be closed for the advancing of PM from position 12, via the *a* arc, in the known manner.

*Position 13.—Check for dead line or changed number*

In position 13, the connections to the static switch are reversed and the *d* conductor of the line is connected to the mid-point of transformer $T_2$, whereas the mid-point of transformer $T_1$ is connected to potential of −43 volts. Under these conditions, the static switch can function only when the potential on the subscriber's *d* conductor is negative with respect to −43 volts. This is the case only when the called line number has been changed. Therefore, the functioning of the static switch and F*tr* in position 13 indicates that the call was directed to a changed number, whereas their non-functioning indicates that the *d* wire is open and, therefore, that the call was directed to a dead line. The latter fact becomes clear from the consideration that the *d* wire of a dead line is consecutively checked for the presence of a potential lower than −46.1 volts, viz. in position 12, and higher than −43 volts, viz. in position 13. When no functioning of the static switch follows in either of these two cases, the only condition that can provoke this is an open circuit.

The result of the non-operation of the static switch and of F*tr* in position 13 is that relay D*lr* operates via the *a* arc in position 13, via break contact $pb_3$, whereas the operation of F*tr* indicating that a changed number has been selected causes the operation of C*nr* via the *b* arc in position 13. The energization of either of these two relays causes PM to step from position 13 to 14 via its *d* arc. In this position PM remains waiting while either relay D*lr* or C*nr* causes the release of the connection to the called number, and the re-routing of the call to a special operator who handles these classes of calls. When the call to the operator has been completed, the register releases and causes the restoration of PM via its *c* arc.

*Local call to busy first P. B. X line*

The potentials prevailing on the *d* conductor of a busy first P. B. X line are either 20.6 or 30.8 volts, the same as in the case of a call to a busy single line in position 11. A check is made with a potential of −34.2 volts connected to the mid-point of transformer $T_2$.

*Position 11.—Check for first P. B. X line busy*

When the call has proceeded to position 11, a circuit will be closed for relay P*br* by the operation of F*tr* in position 11 as follows: Ground, make contact $ft_1$, *b* brush and arc terminal 11, winding P*br* to battery. P*br* locks to ground by its contact $pb_5$, and closes a circuit for the advancing of PM from position 11 to 12 via its *d* arc and contact $pb_2$.

*Position 12.—Passing*

As described in connection with a call to a single line, in position 12 a check is made with −46.1 volts connected to the mid-point of transformer $T_2$, and in the case under consideration the static switch and relay F*tr* will, therefore, function, but the operation of F*tr* will be without result, because the connection from the *b* arc in position 12 is opened at break contact $pb_7$. A circuit to advance the switch from position 12 is closed via contact $pb_2$ and the *d* arc.

*Position 13.—Passing*

As described in connection with a call to a dead line or a changed number, the conditions for the static switch in position 13 are such that it can function only when there is the full battery of −48 volts on the subscriber's *d* wire. In the present case, the static switch cannot operate and consequently a circuit will be closed to advance PM through position 13, as follows: Ground, break $ft_1$ and $pk_4$, brush *a* and arc terminal 13, make $pb_3$, power magnet and series resistance of PM to battery.

*Position 14.—Passing*

Position 14 is passed by a circuit via break contacts $cn_3$ and $dl_3$, and the $d$ arc of the switch.

*Position 15.—P. B. X hunting*

In position 15, a circuit is closed to advance the final selector from the first line of the P. B. X group and to cause it to hunt for a free line or, if none is free, to advance it to the last line. The circuit for the final selector power magnet may be traced as follows: Ground, break $ft_1$ and $pk_4$, brush $a$ and arc terminal 15, make $pb_1$, break $ph_1$, power magnet of final selector to battery. The final selector will hunt until its $d$ brush finds a line with ground potential, indicating that it is free, or on which the potential corresponds to the last line of the group. For this purpose, the $d$ brush of the final is connected to the mid-point of $T_1$ in the static switch, and the mid-point of transformer $T_2$ connected to a potential of −17.4 volts. The static switch cannot function on the potential prevailing on the first P. B. X line from which it starts, because this is in the busy condition and has either 20.6 or 30.8 volts potential; neither can it stop on any of the busy intermediate lines of the group, because they have a potential of either 36.9 or 42.7 volts. It can, however, stop on a free line which has a full ground potential, or on a last line, which has either 7.2 or 14.1 volts potential. The hunting of the switch will, therefore, be terminated when it finds either a free line or the last of the group, in which case F$tr$ operates, causing the final selector to stop and relay P$hr$ to operate via the $b$ arc in position 15. P$hr$ locks by its contact $ph_3$ and closes a circuit for the advancing of PM from position 15 via the $d$ arc.

*Position 16.—Check for busy or free line*

In position 16, a check is again made with −5 volts connected to the mid-point of transformer $T_2$. Under these conditions the static switch can function only when the final selector has found a free line. The operation of F$tr$ causes the energization of S$fr$ via the $b$ arc in position 16. S$fr$, in turn, causes the operation of S$br$ in the following circuit: Ground, make contacts $ph_4$ and $sf_1$, break contact $as_9$, winding S$br$ to battery. As described before, the combined operation of S$fr$ and S$br$ causes the advance of the cord circuit to the ringing condition and the liberation of the register.

In case the static switch does not function in position 16, this indicates that the final selector has stopped on the last line and that this was busy. In this case, a circuit is closed via the $a$ arc in position 16, for the operation of relay S$br$ alone, which causes the cord circuit to advance to the busy condition and the freeing of the register.

*Handling of toll calls*

Toll calls are handled in a manner very similar to local calls, but some differences are required to distinguish between the local and toll busy condition in certain cases. For this purpose, the toll registers are specially arranged so that if they find either a single line or a last P. B. X line in the busy condition, they determine whether it is local or toll busy and cause a corresponding signal to be given to the operator.

Part of a toll register is shown in the bottom half of Figs. 3 and 3$a$. The arrangement is very similar to Figs. 2 and 2$a$, except for the numbering of the positions of the switch PM, in which position N in Fig. 3 corresponds to position 6 in Figs. 2 and 2$a$ and three checking positions are added in which the local or toll busy condition is discriminated. As only calls to busy lines cause a different functioning of the toll register, these will be described exclusively.

*Toll call to busy single line*

When selection is over, contact $cs_1$ closes and drives PM from position N to position 1.

*Position 1.—Check for free called line*

A check is made with a potential of −5 volts connected to the mid-point of transformer $T_2$, so that the static switch will function only if the line is free. For the case under consideration, F$tr$ does not operate and, accordingly, the switch is stopped to position 2.

*Position 2.—Check for called line in absent subscriber condition or passing*

If the line is free, position 2 is utilized to check for a full ground on the subscriber's $d$ conductor, which indicates the absent subscriber condition. If this is found, relay A$sr$ is operated as described for a local call. If no full ground is found, L$br$ is operated, which is the relay fulfilling in the toll register the same functions as relay S$br$ in the local register.

For the case now under consideration, S$fr$ was not operated in position 1, and, therefore, position 2 offers the same testing conditions as position 1, and, accordingly, PM is stepped via the break contact of $ft_1$.

*Position 3.—Passing*

Position 3 is used only in case the line was found to be in the absent subscriber condition; in the present case PM passes this position via break contact $as_3$ and arc $d$.

*Position 4.—Check for last P. B. X line busy*

In position 4, a check is made with −17.4 volts connected to the mid-point of the transformer $T_2$, and the static switch will function only if the line was a last P. B. X line and busy. In the present case, it does not function, so that PM is passed through position 4 via its $a$ arc and break $ft_1$.

*Position 5.—Passing*

Position 5 is used exclusively for checking the difference between local and toll busy, in case a last P. B. X line was selected. In the present case, it is passed via the $a$ arc and break contact $sb_3$.

*Position 6.—Check for first P. B. X line busy*

In position 6, a check is made with a potential of 34.2 volts connected to the mid-point of transformer $T_2$, under which conditions the static switch does not function. PM is passed by this position via its $a$ arc.

*Position 7.—Check for single line busy*

In this position, a check is made with −46.1 volts connected to the mid-point of transformer $T_2$, under which conditions the static switch functions. Accordingly, ground is connected via the $b$ arc in position 7 and break contacts $pb_7$ and $as_9$, for the operation of S$br$. S$br$ indicates that a busy subscriber's line has been selected, and causes the PM switch to go to the next position, in which a discrimination is made between the local and toll busy condition. In the present case, a circuit is closed for the advancing of PM from position 7 to position 8 via $sb_2$ and the $d$ arc.

*Position 8.—Discrimination between local and toll busy on single line*

In position 8, a check is made with a potential of —40.5 volts connected to the mid-point of transformer $T_2$. As the potential at the subscriber's *d* conductor is 36.9 volts in case of local busy, and 48.7 volts in case of toll busy, the static switch will function in the former case only. Accordingly, when *Ftr* energizes, it closes a circuit in position 8, via break contact $pb_2$, for the operation of relay *Lbr*. This relay causes the advancing of the toll connecting circuit and the liberation of the toll register.

The toll connecting circuit is brought into the condition in which it indicates the local busy condition of the called line to the operator, and will permit the operator to break down the local connection. As already mentioned, toll breakdown may be effected by the operator by causing the momentary connection of a high negative potential to the subscriber's *d* conductor, which in the local connecting circuit causes the operation of the breakdown relay *Plr*. When the local connection has been broken down, the toll cord circuit can make the called line toll busy by the application of —48 volts via 2,400 Ω to the subscriber's *d* conductor.

Assuming the called line to be already toll busy, when PM makes a check in position 8 the static switch will not function, and, accordingly, relay *Tbr* is operated via the *a* arc in position 8 and make contact $sb_3$. *Tbr* frees the register, advances the toll connecting circuit to signal the toll busy condition of the called line to the operator, and prevents any attempt on the part of the operator to effect breakdown.

*Toll call to last P. B. X line in busy condition*

When a busy last P. B. X line is selected directly, the operation proceeds in the same way as described for the case of a call to a busy single line, up to position 4 of switch PM. In this position, a check is made with —17.4 volts potential connected to the mid-point of transformer $T_2$. In the case of a busy last P. B. X line, the static switch will function, causing the operation of *Ftr* and the energization of relay *Sbr* in position 4, via the *b* arc and break contact $as_9$.

As already explained, *Sbr* is the relay that controls discrimination between local and toll busy conditions, for which purpose it advances PM to the next position, by means of break contact $sb_2$ via arc *d*.

*Position 5.—Discrimination between local and toll busy on last P. B. X line*

In position 5, a check is made, with a potential of —10.9 volts connected to the mid-point of transformer $T_2$. As the potential at the subscriber's *d* wire is —7.2 volts for local busy last P. B. X lines, and 14.1 volts for toll busy last P. B. X lines, the static switch will now function in the former case only. Accordingly, when the line is local busy, *Lbr* will operate, and when the line is toll busy, *Tbr* will operate, in precisely the same way as for the case of a busy single line in position 8. These two relays perform the functions described and cause the liberation of the register.

*Total call to busy P. B. X group*

In case a busy P. B. X group is called by selecting the first P. B. X line, the operation will proceed as described for a toll call to a single busy line, up to position 6 of PM. In this position, a check is made with —34.2 volts connected to the mid-point of transformer $T_2$, and the static switch will function on a busy first P. B. X line, for which the potential at the *d* conductor will be either 20.5 volts or 30.8 volts. *Ftr*, by operating, causes the operation of *Pbr* in position 8, via the *b* arc. Make contact $pb_2$ advances PM from position 6 via its *d* arc.

*Position 7.—Passing*

In position 7, a check is made with —46.1 volts connected to the mid-point of the transformer $T_2$, and the static switch will function. The operation of *Ftr* is, however, ineffective, because the circuit via make contact $ft_1$ is opened by break contact $pb_7$, so that *Sbr* cannot energize. *Pbr* advances PM through position 7 over its contact $pb_2$ and the *d* arc.

*Position 8.—Passing*

In position 8 a check is made with 40.5 volts connected to $T_2$, and again the static switch functions, but the operation of *Ftr* is again ineffective, owing to the circuit via its make contact being opened at contact $pb_2$, so that *Lbr* cannot energize. PM is advanced from position 8 by contact $pb_4$, via the *d* arc.

*Position 9.—Passing*

The conditions in position 9 are such that the static switch can function only when full 48-volt battery potential is present on the subscriber's *d* conductor. Accordingly, the static switch will not function in the present case, which will cause PM to advance via its *a* arc and make contact $pb_3$.

*Position 10.—Passing*

Position 10 is passed via break contacts $cn_3$ and $dl_3$ and the *d* arc.

*Position 11.—P. B. X hunting*

In position 11, *P. B. X* hunting is controlled, the circuit for the power magnet of the final selector being completed in this position via contacts $ph_1$ and $pb_1$ and the *a* arc of PM whereas the static switch is so connected that it will function whenever a free line or the last line of the group is found, i. e. with —17.4 volts connected to $T_2$. In the case under consideration, when all lines are assumed to be busy, the final will be stopped on the last line of the group, causing the advance of PM to position 12, after the operation of relay *Phr* via the *b* arc.

*Position 12.—Discrimination between free line and busy last P. B. X line*

A check is made between the free and busy condition of the line in the known way, by connecting —5 volts to transformer $T_2$, owing to which this will function only for a free line, and cause the operation of *Sfr* and *Lbr*, whereas for a busy last P. B. X line *Sbr* is made to operate via the *a* arc and break contact $as_9$. This relay, as already described, causes the switch to discriminate in the next position between local and toll busy, whereupon PM is advanced from position 12, via contact $sb_4$ and the *d* arc.

*Position 13.—Discrimination between local and toll busy*

In position 13 a check is made with —10.9 volts connected to the mid-point of transformer $T_2$. As the potential at the *d* conductor of a busy last P. B. X line is either —7.2 volts for a local busy line, or 14.1 volts for a toll busy line, the static switch will function in the former case only, and will cause the operation of relay Lbr via the b arc in the case of a local busy line, or of Tbr via the a arc and make contact $sb_3$ in the case of a toll busy line. The function of relays Lbr and Tbr is as described for a toll call to a busy single line.

*Alternative arrangement for restricted service subscribers' lines*

The invention is not limited to the arrangement shown in the drawings, and various alternative methods may be employed, based on the same principles as disclosed herein. For example, an alternative method of distinguishing between restricted and non-restricted lines is to indicate this difference not by the presence or absence of the rectifier $Re_3$ in the c conductor of the subscriber line, but by arranging the line circuit in such a manner that the calling potential on the c multiple is substantially different for the two cases.

The drawings show a subscriber's line circuit composed of resistances only, and with this line circuit the potential which is applied to the c conductor of a calling line will be in the neighborhood of −24 volts because the total resistance over which ground is connected through the subscriber's loop to the point of juncture of the 15,000 Ω and 30,000 Ω resistances is approximately 30,000 Ω, so that this point of juncture will have half the battery potential.

Restricted lines may be distinguished by an arrangement in which this calling potential becomes substantially less, e. g. something like −8 volts. This may be effected by increasing the value of the resistance shown as 30,000Ω to something like 150,000Ω. The distinction between a non-restricted line and a restricted line may then be found by checking the potential prevailing on the subscriber's c conductor with reversed connections on the static switch, and with a potential of −10 volts connected to the mid-point of transformer $T_1$, instead of with a ground as shown in Fig. 1, in position 2. Under these conditions, the static switch will function when the potential at the subscriber's c conductor is in the neighborhood of −24 volts, but it will not function when it is in the neighborhood of −8 volts.

There are obviously other methods by means of which this difference of potential may be produced on the c conductor. For example, in other line circuits in which no resistances are employed, but regular line and cut-off relays, the operation of the line relay may cause the closure of a circuit to a potentiometer, from which either a potential of −8 volts or −24 volts may be taken to the c multiple.

*Restriction of P. B. X hunting*

Referring now to Fig. 4, this shows schematically a number of test conductors for a number of lines which have been numbered from 1 to 6. Lines 1 and 6 are shown as individual lines, and their test conductors are connected to ground through 19,000 ohms. Lines 2, 3, 4 and 5 constitute a P. B. X group, and in normal condition the first of these lines, No. 2, is connected to ground via a resistance of 4,300 ohms, and the last, No. 5, is connected to ground through the 1,000 ohm winding of a relay Lar, so that these lines have the characteristic electric condition corresponding to first and last lines of a group, respectively. The intermediate lines are connected to ground through 19,000 ohms, as required for this kind of lines. The drawing further shows that a potential through either 5,700 ohms or 2,400 ohms may be connected over the d brush of a selector, to bring any of these lines into the engaged condition, the potential over 5,700 ohms being used for local connections, and that over 2,400 ohms being used for toll connections.

So long as not all the lines are engaged, the operation on any call to those lines will take place as described for Figs. 1 to 3, and this holds good also in case all lines are engaged, with the last line engaged in a local connection, when relay Lar, through which ground is conducted to test conductor No. 5, does not operate.

In case a further toll call is directed to the P. B. X group in the last-mentioned case, the final selector will go to line No. 5, and the operator may break down the existing local connection in favor of the toll connection. However, when this line becomes toll busy relay Lar energizes, because it is so adjusted that it may operate in series with the 2,400 ohms over which battery is connected in case of toll busy. It then connects through the 1,000-ohm winding of relay Lar to the last line but one of the group, in parallel with the 19,000 ohms already connected to the test conductor thereof. Accordingly, this test conductor is now connected to ground through a total of 1,000 ohms, and successive calls to this group will not terminate P. B. X hunting on this line.

Assuming that the last line but one becomes or was already engaged on a toll connection, relay Lbr also energizes and connects ground through the 1,050 ohm winding of relay Lcr to the last line but two. In this manner, P. B. X hunting may be restricted, so that hunting final selectors will stop either on a free line or on the last local busy line of the group. The relay which is connected to the second line of the group, when operating on a toll connection, i. e. when all following lines are already engaged for toll connections, connects a resistance of 1,300 ohms in parallel to the resistance of 4,300 ohms already connected to the test conductor of the first line of the group. Therefore, if all lines of the group excepting the first are toll busy, ground will be connected to this first line via a total of 1,000 ohms, and a register finding this electrical condition will not initiate huning, irrespective of whether this line is free or busy. Eventually it may find this line in the local or the toll busy condition and give a corresponding signal to the toll operator.

What I claim is:

1. In a telecommunication system, a switching exchange, a plurality of lines of different service classifications to be automatically interconnected through said exchange each line having an individual test conductor whose potential determines the line classification and its busy or idle condition, a source of service classification potential connected to the line test conductors in accordance with their respective service classifications, automatic means including initial and final automatic switches for progressively extending a connection from a calling line to a called line, register means at the exchange and operated to successive settings correlated with the progress of said connection being extended and including test means which is discriminatingly responsive to the various service classifications of calling and called lines, means associated with the register and effective for different settings of said register for applying correspondingly different potentials to said test means, means including certain of said switches for connecting said test means with the test conductor of the calling line for certain register settings and for connecting said test means with the test conductor of the called line for other register setting, and means for rendering said test means selectively responsive when a predetermined potential relationship exists between the said individual potential on a test conductor and the said corresponding potential applied from the register to said test means.

2. In a telecommunication exchange system, a switching exchange, a plurality of lines of different service classifications to be automatically interconnected through said exchange each line having an individual test conductor and having connected thereto an individual potential to determine the line service classification and the busy or idle condition of the line, automatic means including initial and final selector switches for extending a connection from a calling line to a called line, register means including an automatic switch which is moved to successive positions correlated with the progress of the extension of said connection said register means including test means, means including said initial switch for connecting the test conductor of a calling line with said test means when said automatic switch is in a certain position and for connecting the test conductor of a called line with said test means when said automatic switch is in other positions, a source of different test potentials assoicated with the register, means including contacts of said automatic switch for applying respective test potentials to the calling line test conductor and to the called line test conductor, and means for rendering said test means selectively responsive only when a predetermined potential relationship exists between the test potential applied to a line test conductor through said automatic switch and the said individual potential on the said test conductor.

3. A system according to claim 2 in which test means comprises a gaseous discharge tube, rectifier means connected in circuit with said tube, said rectifier means being selectively biased to conduction or non-conduction in accordance with said predetermined potential relationship.

4. A system according to claim 2 in which said test means is normally non-conductive and becomes conductive only when said potential relationship is such that the test potential applied to the line from said source of potential at the register has a higher value than the said individual potential connected to the test conductor of the line.

5. A system according to claim 2 in which said test means includes a circuit having input and output elements interconnected by rectifier means, an alternating current source connected to said element, circuit connections for connecting the said input element through said automatic switch to a line test conductor and for connecting the said output element also through said switch to said source of test potentials at the register, said test means also including a device which is selectively rendered conductive in accordance with the relation between the potentials applied at said input element and at said output element.

6. A system according to claim 2 in which said test means includes a circuit having an input transformer and an output transformer interconnected by rectifier means, an alternating current source connected to the input transformer, a test responsive device coupled to the output transformer and a circuit bridging the midpoints of the said transformers said circuit being completed over one branch extending through said automatic switch to the line test conductor and over another branch through said automatic switch to said source of different potentials at the register.

7. A system according to claim 2 in which said automatic switch includes a first brush which is moved to successive positions to connect the said test means to progressively increasing direct current test potentials at said source of different potentials at the register, and a second brush for connecting the said test means to the line test conductor.

8. A system according to claim 2 in which the said test circuit has two coupling coils and two rectifiers completing a loop circuit therebetween, one of said coils being coupled to a gaseous conduction valve and the other coil being coupled to a source of alternating current, said rectifiers being selectively biased to conduction or non-conduction in accordance with said potential relationshp.

9. A system according to claim 2 in which certain of said lines have their test conductors disconnected from individual potential, and the said potential relationship is such that for a certain position of said automatic switch no circuit is completed through said test means to render it selectively responsive.

10. A system according to claim 2 in which said lines are divided into classes, namely: single or intermediate P. B. X lines; first P. B. X lines; last P. B. X lines; absent-subscriber service lines: the test conductors for the first three of said classes of lines being connected to one pole of a potential source which supplies said individual potentials but through respective service characterizing resistances; and said pole is connected directly to the test conductor of lines equipped for absent-subscriber service.

11. A system according to claim 2 in which P. B. X hunting means are provided for the final selector switch means, said hunting means being controlled by said test circuit and including means for terminating said hunting at the last line of a P. B. X group if no free P. B. X line is available in that group, said source of different potentials at the register including a voltage divider having a series of voltage dividing taps connected to certain predetermined bank contacts of said automatic switch, the voltage between the successive taps of said divider being proportioned so that when said final selector connects with the test conductor of a busy first P. B. X line of a P. B. X group the said test circuit causes said final selector to hunt for a free P. B. X line, and means for sending a busy signal to the calling line when said final selector directly seizes an intermediate P. B. X line or a last P. B. X line which is busy.

12. A system according to claim 1 in which a characteristic individual potential normally is applied at the test conductor of a line equipped for absent-subscriber service, and said test means is connected to said register to cause the calling line to be extended to an operator's position when said predetermined potential relationship represents a line equipped for said absent-subscriber service.

13. A system according to claim 1 in which certain of said lines have a characteristic individual potential applied thereto for a barred-service condition; and said test means is connected to said register to cause the register to release to normal the previously-operated selector switches used in extending the connection; additional automatic switching means; an operator's position; and means responsive to a barred-service response by said test means to operate said additional switch means to extend the calling line to said operator's position.

14. A system according to claim 2 in which said test means has means to discriminate between intra-exchange calls and inter-exchange calls, and means for producing a characteristic response in the test means when the called line is in a toll-busy condition or in a local-busy condition.

15. A system according to claim 2 in which means are provided to discriminate between a called line which is in a toll-busy condition and a called line which is in a local-busy condition, and said test means includes discriminating means effective to establish a toll connection to a called line which is in a local-busy condition.

16. In a telecommunication exchange system, a source of direct current potential, a plurality of lines of different service classifications including absent-subscriber service, each of said lines having a test conductor with the lines equipped for said absent-subscriber service being connected to one pole of said source, a plurality of automatic selector switches including initial and final selectors for progressively extending a connection from a calling line to a called line, a register including line service test means at the exchange said register also including an automatic switch which assumes successve settings in correlation with the said progressive extension of the connection, said automatic switch being effective in one position to connect said test means to the test conductor of a calling line and effective in another position to connect said test means to the test conductor of a called line, means in the register and correlated with the progress of said extension for successively applying different potentials to said test means when it is connected with the calling line and for successively applying different potentials to said test means when it is connected to a called line, a special operator's position, means for operating said test means only when a predetermined potential relationship exists between the particular one of said different potentials applied to said test means by the register and the individual characterizing potential on the test conductor of the line with which the register is connected, and means operative in response to the extension of the connection to a called line equipped for said absent-subscriber service for controlling the extension of the calling line to said operator's position.

17. A system according to claim 2 in which the called lines are arranged in groups the last line of each group having a special individual characterizing potential thereto to distinguish it as the last line, and a marginal relay is connected in circuit with the test conductor of said last line for applying said special potential to the test conductor of the preceding line in the group.

MARTINUS DEN HERTOG.

REFERENCES CITED

The following references are of record in the file of this patent:

FOREIGN PATENTS

| Number | Country | Date |
|---|---|---|
| 907,195 | France | Mar. 5, 1946 |